(12) United States Patent
Del Rosso

(10) Patent No.: US 7,725,001 B2
(45) Date of Patent: May 25, 2010

(54) METHOD AND DEVICE FOR OPTICAL FIBER CONNECTION

(75) Inventor: Giovanni Del Rosso, Milan (IT)

(73) Assignee: Pirelli & C. S.p.A., Milan (IT)

( * ) Notice: Subject to any disclaimer, the term of this patent is extended or adjusted under 35 U.S.C. 154(b) by 0 days.

(21) Appl. No.: 12/223,377

(22) PCT Filed: Jan. 31, 2006

(86) PCT No.: PCT/EP2006/050570

§ 371 (c)(1),
(2), (4) Date: Jul. 30, 2008

(87) PCT Pub. No.: WO2007/087897

PCT Pub. Date: Aug. 9, 2007

(65) Prior Publication Data

US 2009/0103865 A1 Apr. 23, 2009

(51) Int. Cl.
G02B 6/00 (2006.01)
G02B 6/26 (2006.01)
G02B 6/42 (2006.01)

(52) U.S. Cl. ........................... 385/136; 385/31; 385/32; 385/39; 385/48; 385/49; 385/134

(58) Field of Classification Search .................. 385/32, 385/48, 136

See application file for complete search history.

(56) References Cited

U.S. PATENT DOCUMENTS

| | | | | |
|---|---|---|---|---|
| 4,557,550 A | * | 12/1985 | Beals et al. ..................... | 385/32 |
| 4,586,783 A | * | 5/1986 | Campbell et al. ............. | 385/32 |
| 4,714,314 A | * | 12/1987 | Yang et al. ..................... | 385/42 |
| 4,741,585 A | * | 5/1988 | Uken ............................ | 385/32 |
| 4,747,652 A | * | 5/1988 | Campbell et al. ............. | 385/32 |
| 4,759,605 A | | 7/1988 | Shen et al. | |
| 4,834,482 A | * | 5/1989 | Campbell et al. ............. | 385/32 |
| 4,950,046 A | | 8/1990 | Hughes et al. | |
| 4,961,620 A | * | 10/1990 | Uken et al. .................... | 398/45 |
| 5,037,170 A | * | 8/1991 | Uken et al. ................... | 385/32 |
| 5,069,519 A | | 12/1991 | James et al. | |
| 5,315,675 A | * | 5/1994 | Dennis et al. ................. | 385/32 |
| 5,333,217 A | | 7/1994 | Kossat | |

(Continued)

FOREIGN PATENT DOCUMENTS

GB 2158607 A * 11/1985

*Primary Examiner*—Ryan Lepisto
(74) *Attorney, Agent, or Firm*—Finnegan, Henderson, Farabow, Garrett & Dunner, L.L.P.

(57) ABSTRACT

A device for coupling an optical fiber includes: a first surface and a second surface, including respective active surface portions; at least one optical fiber positioning element adapted to position at least one point of an optical fiber on a longitudinally median plane of the second surface. The first and second surfaces are movable relative to one another between a first and a second relative position, and, when in the second relative position, cooperate to accommodate a section of the optical fiber therebetween. In this position, the first and second active surface portions cooperate to keep the optical fiber in a predetermined bent condition, particularly adapted to extract light from, or inject light into, the optical fiber. In at least a part of the relative movement from the first to the second relative positions, the first surface rotates with respect to the second surface around a rotational axis oriented transversally with respect to the median plane.

27 Claims, 9 Drawing Sheets

U.S. PATENT DOCUMENTS

| | | | |
|---|---|---|---|
| 5,334,832 A * | 8/1994 | Levinson et al. | 250/227.24 |
| 5,347,602 A * | 9/1994 | Finzel | 385/25 |
| 5,483,610 A | 1/1996 | Cox | |
| 5,519,795 A * | 5/1996 | Bender et al. | 385/13 |
| 5,708,499 A | 1/1998 | Baden et al. | |
| 6,754,417 B2 * | 6/2004 | Nishimura et al. | 385/48 |
| 2003/0202747 A1 | 10/2003 | Nishimura et al. | |

* cited by examiner

METHOD AND DEVICE FOR OPTICAL FIBER CONNECTION

CROSS REFERENCE TO RELATED APPLICATION

This application is a national phase application based on PCT/EP2006/050570 filed Jan. 31, 2006, the content of which is incorporated herein by reference.

BACKGROUND OF THE INVENTION

1. Field of the Invention

The present invention relates in general to optical communications, particularly to optical data communication networks for distributing signals to a plurality of user apparatuses, and specifically to devices for optical fiber connection, e.g. for connecting optical cables to opto-electronic devices adapted to perform electro-optical conversion.

2. Description of Related Art

Currently, in the field of telecommunications, optical technology is mainly used for long-distance transmission of optical signals, taking advantage of the wide band offered by optical fibers. Electrical cables, such as coaxial cables or cables consisting of copper pairs, are instead still predominantly used for the transmission of signals (in a wide range of applications like digital television, telephone, data exchange accomplished via dial-up or xDSL Internet connection) from and towards end users and the exchange of data between electronic appliances (such as personal computers, printers, storage devices) of a Local Area Network (LAN).

However, electrical cables have a relatively narrow bandwidth, and are becoming a limiting factor against the achievement of high transmission rates. Moreover, electrical cables raise problems of electromagnetic interference and impedance matching. Furthermore, electrical cables are relatively stiff, and thus are difficult to insert into the suitable raceways of a building (which, for electrical safety requirements, are to be distinct from the raceways used for the distribution of electrical energy), and, due to their bulkiness, the number of cables that can be inserted in the raceway is limited.

Research interest is therefore steering towards the possibility of using optics not only in the long-distance signal transmission, but also in local networks for distributing signals to a plurality of user apparatuses, for example in a residential building or in an office.

Fiber optic cables have a very large bandwidth, low attenuation values and are essentially transparent to the bit rate, the format and the transmission code; additionally, fiber optic cables are not bulky, rather they are flexible, light, free from electromagnetic interference and have low bending losses; moreover, they can be inserted in the same raceways used for the distribution of electrical energy.

However, for the connection to electronic appliances, fiber optic cables require the use of opto-electronic devices, i.e. devices adapted to perform an optical-to-electrical, or, conversely, an electrical-to-optical conversion, so as to convert the optical signals into corresponding electrical signals, and vice-versa. The conversion of an optical signal into a corresponding electrical signal is conventionally carried out through a photo-detector, whereas the conversion of an electrical signal into a corresponding optical signal is conventionally carried out by an opto-electronic device including a light source, e.g. a laser, emitting light whose intensity can be modulated according to the information transported by the electrical signal.

The connection of an optical fiber to a light source and/or to a photo-detector is conventionally carried out through an optical connector. Typically, an optical connector is a device comprising two parts that can be releasably connected to each other and that must be attached one to an end of the optical fiber, and the other one to a pig-tail of the light source or of the photo-detector.

For example, the installation of an optical cable comprising an optical fiber, suitable for example for setting up a (unidirectional) point-to-point link within a building, between a user electronic appliance and a distribution unit (located, for example, in an office or apartment and, respectively, in the cellar or loft) requires (in addition to the passage of the optical cable along a suitable raceway of the building, from the cellar/loft to the office/apartment): cutting the optical cable to the necessary length; peeling off the optical cable jacket, applying the optical connectors to the two ends of the optical fiber, respectively at the user appliance and at the distribution unit; possibly, applying optical connectors to the light source and to the photo-detector (in the case in which the light source and the photo-detector are not already equipped with connectors); and, finally, connecting, through the connectors, one end of the fiber to the light source, and the other end of the fiber to the photo-detector, respectively at the distribution unit and at the user appliance side, or vice versa; the operations are to be repeated twice in case of a bidirectional link.

An alternative known technique for connecting an optical fiber to an opto-electronic device is by means of a fused junction between an end of the optical fiber and a pigtail of the opto-electronic device.

However, using optical connectors and fused junctions is cumbersome and critical operations are necessary that involve fiber stripping (i.e., removal of the protective outer fiber coating), cleaving and polishing operations, which are very delicate to carry out on site, require high precision (tolerances are in the range of micrometers), and have to be executed by highly specialized personnel, using special tools. All this increases the installation time and costs. Moreover, it often happens that these complex operations have to be carried out in inconvenient and narrow spaces (for example, under a table or desk), increasing the risk that the optical fiber connection is not accomplished with the necessary precision, with the consequence that the link performance strongly reduces.

Therefore, despite their several advantages, the use of fiber optic cables in networks for distributing signals to a plurality of end users has up to now been highly limited both due to the high installation costs and because the optical connection may be unreliable if the aforementioned operations are not carried out correctly.

Thus, there is a strong need of simplifying the installation of a fiber optic network for distributing signals to a plurality of users, ensuring a high degree of reproducibility and limiting the installation costs.

SUMMARY OF THE INVENTION

The Applicant has found that such a problem can be solved by using a technique that allows an optical signal to be extracted/injected from/into an optical fiber without the need of "connectorizing" the optical fiber, or of making a fused junction, but through suitable bending of the optical fiber.

Indeed, the Applicant has observed that with this technique the optical fiber terminations can be accomplished leaving the fibers complete of their protective coating (provided that the same is sufficiently transparent). Differently from the use of connectors or fused junctions, when using fiber bending the terminal face of the optical fiber has no particular optical function, so the aforementioned critical operations of stripping, cleaving and polishing of the fiber, required by the use of optical connectors or fused junctions, are eliminated.

The Applicant observes that the principle of extracting/injecting light from/into an optical fiber through bending thereof is per-se known in the art.

For example, U.S. Pat. No. 4,759,605 describes an apparatus for injecting light into, or withdrawing light from an optical fiber using a resiliently deformable material, which includes a hard transparent member disposed in contact with a surface of the resiliently deformable material in a vicinity of a light element (either a light source or a light detector). The resiliently deformable material includes a surface which is curved about a predetermined bend radius profile optimal for coupling or decoupling light. A bending element has a groove on a bent surface thereof and is adapted to press the optical fiber against the surface of the resiliently deformable material, so as to maintain the optical fiber in a bent configuration, and to position it at a precise location on the surface to obtain optimum coupling/decoupling efficiency.

Another example is provided by U.S. Pat. No. 4,950,046, which describes a fiber optic coupler having a cylindrical rod protruding along the apex of an angled block, and an optical waveguide mounted to extend around part of the circumferential of the rod. A transparent body is located on the side of the fiber remote from the rod, and the rod and the body are biased together to bend the fiber around the rod surface and to form an intimate contact between the transparent body and the curved part of the fiber. A light input or output device is positioned to direct light at or receive light from the curved fiber part through the transparent body.

Further examples are provided in U.S. Pat. No. 5,069,519, U.S. Pat. No. 5,333,217 and U.S. Pat. No. 5,483,610.

However, the Applicant observes that, in the art, the technique of light extraction/injection from/into an optical fiber by bending has so far been used for tapping light, not for accomplishing a real fiber termination, i.e. an ideally total (100%) light extraction/injection. According to the Applicant, being the known optical couplers based on the fiber bending principle designed for fiber tapping, not for fiber termination, they are unsuitable for applications in the field of fiber optic networks for distributing potentially wideband signals to a plurality of users, which require high coupling efficiencies so to achieve the desired high transmission rates over significant distances, i.e. a high power budget.

In particular, the Applicant observes that the known coupling devices are complex, include separate parts, are bulky, and not easy to be used. In addition, they do not guarantee a high reproducibility of the fiber coupling which is needed for a high bit-rate, long reach optical system having low deployment costs.

Also, the Applicant observes that the devices known in the art for keeping an optical fiber in a bent condition, suitable to extract/inject light from/into the fiber, are not adapted to ensure an efficient light coupling.

For example, in the coupler of U.S. Pat. No. 4,950,046, the correct positioning of the optical fiber is not guaranteed, because the optical fiber is clamped between the transparent body and the rod only in a very short fiber portion, being essentially unclamped, free to move in the remaining fiber portions, adjacent to the short clamped portion. As a consequence, the optical fiber is not held firm, being for the most part thereof free.

In U.S. Pat. No. 4,759,605, the presence of the groove in the fiber bending element helps ensuring the fiber positioning. However, in that device as the bending element is brought towards the surface of the resiliently deformable material, due to inevitable irregularities of the parts surfaces, the optical fiber may get pinched in two positions at both sides of a fiber section where the light has to be extracted/injected: if this occurs, bringing the bending element closer to the resiliently deformable material surface may induce in the fiber stresses that cannot be dissipated, and the optical fiber may become corrugated in the section thereof that is expected to be optically active for the light extraction/injection, or the intimate contact of the fiber with the resiliently deformable material surface may be prevented, with the result that the efficiency of the optical coupling is greatly impaired.

The Applicant has thus tackled the problem of providing a device that, using a suitable mechanism, is adapted to accomplish a fiber termination, ensuring a high power budget, by accommodating and keeping with high precision the fiber properly bent and in optical alignment with respect to, e.g., the opto-electronic device, and is simple to use, so that the operations of connection of the optical fiber to the opto-electronic device can be carried out by any technician, even if not specialized in optical cable terminations, or, possibly, even by the final user.

The Applicant has found that the above problem can be solved by providing two surfaces including respective active surface portions and movable relative to one another between a first and a second relative positions, at least partly by relative rotation of a first one of the two surfaces with respect to a second one of the two surfaces around a rotational axis oriented transversally with respect to a median plane thereof. When in the second relative position, the two surfaces cooperate to accommodate a section of the optical fiber therebetween, in a way such that the active surface portions cooperate to keep the optical fiber in a predetermined bent condition, adapted for example for extracting or injecting light from or into the fiber.

According to an aspect of the present invention, a device for coupling an optical fiber is provided. The device comprises:

a first surface and a second surface, the first and second surfaces including respective active surface portions;

at least one optical fiber positioning element adapted to position at least one point of an optical fiber on a longitudinally median plane of said second surface;

wherein the first and second surfaces are movable relative to one another between a first and a second relative positions, the first and second surfaces, when in the second relative position, cooperating to accommodate a section of the optical fiber therebetween, so that the first and second active surface portions cooperate to keep the optical fiber in a predetermined bent condition;

and wherein, in at least a part of the relative movement from the first to the second relative positions, the first surface rotates with respect to the second surface around a rotational axis oriented transversally with respect to said median plane.

In particular, said predetermined bent condition is adapted to enable extraction or injection of optical energy from or into the optical fiber.

In particular, one of the first and second surfaces is pivotally mounted with respect to the other of the first and second surfaces, so as to form a lever of the second kind.

In an embodiment of the invention, the device comprises a ridge having a groove longitudinally extending along the top of the ridge, and said second surface lies on the groove surface.

In an embodiment of the invention, the device comprises a pair of walls defining a channel therebetween, wherein said first surface lies on a bottom surface of the channel.

Preferably, at the second relative position, a gap is defined between said walls and said ridge at least in correspondence of said active surface portions, said gap increasing in width in moving along a portion of said walls towards the channel bottom surface.

Even more preferably, said gap, at a given height along the walls, increases in width in moving from a position proximate to the at least one optical fiber positioning element towards a position in correspondence of the active surface portion.

One among said ridge and said channel may be formed on a clamp body, and the other one among said ridge and said channel may be formed on a fiber pressing member coupled to the clamp body so as to be rotatable relative to the clamp body around said rotational axis. The fiber pressing member may be hinged to the clamp body by means of a pivot.

In an embodiment of the invention, said at least one optical fiber positioning element includes two optical fiber positioning elements, at least one of said two optical fiber positioning elements being formed in said clamp body substantially at a respective longitudinal end of said first surface.

Both the two optical fiber positioning elements may be formed in said clamp body substantially at respective longitudinal ends of said first surface. Alternatively, one of said two optical fiber positioning elements may be formed in the fiber pressing member at a position proximate to said rotational axis.

The device may further comprise an optical coupling structure integrally formed with either one of said first and second surfaces. The optical coupling structure may include a transparent material, particularly Zeonex®. Preferably, a light focusing element may be integrally formed with said optical coupling structure. In case the predetermined bent condition is adapted to extract optical energy from the optical fiber, an angle formed between an axis of said light focusing element and an optical axis of said optical coupling structure may range from −20° to 30°, preferably from 0° to 20°, even more preferably from 3° to 10°, particularly from 6° to 7°. In case the predetermined bent condition is adapted to inject optical energy from the optical fiber, an angle formed between an axis of said light focusing element and an optical axis of said optical coupling structure may range from −20° to 20°, preferably from 5° to 11°.

In a preferred embodiment of the invention, a seat may be provided in the device, adapted to accommodating an opto-electronic device in optical coupling relationship with said optical coupling structure. Said seat may be adapted to accommodating a photodetector responsive to the optical energy extracted from the optical fiber, or a light source for injecting light into the optical fiber.

In an embodiment of the invention, a mode scrambling structure may be provided along at least one of said first and second surfaces. The mode scrambling structure may in particular include a succession of complementary corrugations formed in said first and second surfaces and adapted to corrugate a portion of the optical fiber when clamped between the first and second surfaces. The mode scrambling structure is in particular located proximate to the active surface portion.

A locking arrangement may be provided, activatable to lock the fiber pressing member in the second position.

According to another aspect of the present invention, a method of coupling an optical fiber is provided, comprising:

providing a first surface and a second surface, the first and second surfaces including respective active surface portions;

positioning at least one point of an optical fiber on a longitudinally median plane of said second surface;

rotating the first surface relative to the second surface around a rotational axis oriented transversally with respect to said median plane, so as to bring the first and second surfaces from a first relative position into a second relative position, adapted to accommodate a section of an optical fiber therebetween, the first and second active surface portions cooperating to keep the optical fiber in a predetermined bent condition.

BRIEF DESCRIPTION OF THE DRAWINGS

The features and advantages of the present invention will be made clear by the following detailed description of an embodiment thereof, provided merely by way of non-limitative example, description that will be conducted making reference to the accompanying drawings, wherein.

DETAILED DESCRIPTION OF THE PREFERRED EMBODIMENT(S)

Figure 1:
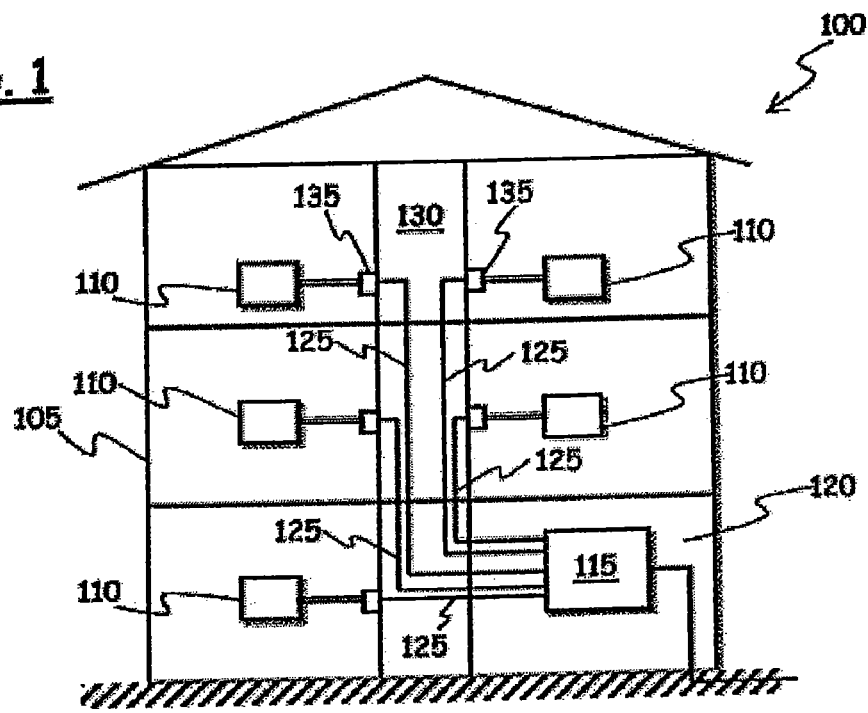
FIG. 1 pictorially shows an exemplary and not limitative scenario wherein a device according to an embodiment of the present invention is particularly useful.

In FIG. 1 an exemplary scenario is depicted wherein a device according to an embodiment of the present invention is advantageously used. The considered scenario is that of a typical residential application, wherein a data communications network 100 brings network access to end users within a building 105. For example, the network 100 can be used to make available cable television (e.g., on-demand television), telephone, Internet and equivalent services at end users' electronic appliances 110 that can include for example television sets, personal computers, telephones or equivalent appliances.

A distribution unit 115 is arranged in a cellar or basement 120 of the building 105, and point-to-point optical cable links 125—with the respective optical cables housed in a suitable raceway 130 of the building—connect the distribution unit 115 to the user appliances 110 situated in the users' apartments at the various levels of the building.

For each of the point-to-point optical cable links 125, at least one (normally a plurality of) socket 135 is provided in the user apartment, for example in the form of a conventional wall-mounted socket including an RJ45-type connector adapted to the connection of the user electronic appliance 110 via an electrical cable. Incorporated in the socket 135 are opto-electronic conversion devices, particularly an optical-to-electrical conversion device, like a photo-detector, for converting optical signals carried by the optical-cable link 125 from the distribution unit 115 into electrical signals usable by the user's electronic appliance 110, and/or an electrical-to-optical conversion device, e.g. a laser, for converting the electrical signals coming from the electronic appliance 110 into optical signals to be injected into the optical-cable link 125. The opto-electronic conversion devices can advantageously be powered through an electrical power supply already present in the home's wall. An optical coupling between the optical-cable link 125 and the opto-electronic conversion devices is also provided.

A similar opto-electronic conversion may be accomplished at the other end of each optical-cable link 125, i.e. at the distribution unit 115.

It is pointed out that, in a typical application, the optical-cable links 125 can comprise, along their paths, one or more connection points, connecting to each other two or more optical-cable link sections. The connection may be accomplished through optical connectors, mechanical joints for optical fibers, fused junctions, or other techniques available for joining two optical fibers. To this purpose, the technique described in the present invention may be applied to the end of both the optical fibers to be connected, so that, by proper mutual alignment of the bent portion of the two fibers, a high performance, low cost and reliable connection may be achieved. The distribution unit 115 may be arranged in a cellar or in a basement of the building 105, and on each floor of the building a suitable centralized connection point (patch panel) may be provided for the management of the intermediate fiber terminations. Moreover, each point-to-point optical-cable link may for example comprise two parts, each part terminating at one end with opto-electronic conversion devices and, at the other end, with an optical connector. In this way, one of the two parts of the point-to-point link shall connect the distribution unit 115 and the centralized connection point, whereas the other part of the point-to-point link shall connect the centralized connection point and the respective user apparatus. The two parts of the point-to-point link can be connected together and disconnected apart through the optical connectors. This type of structure allows the final user to bring the fiber optic point-to-point link directly at each user apparatus through an architecture compatible with that already present in the structured wiring standards (CEI EN 50173-1).

Figure 2:
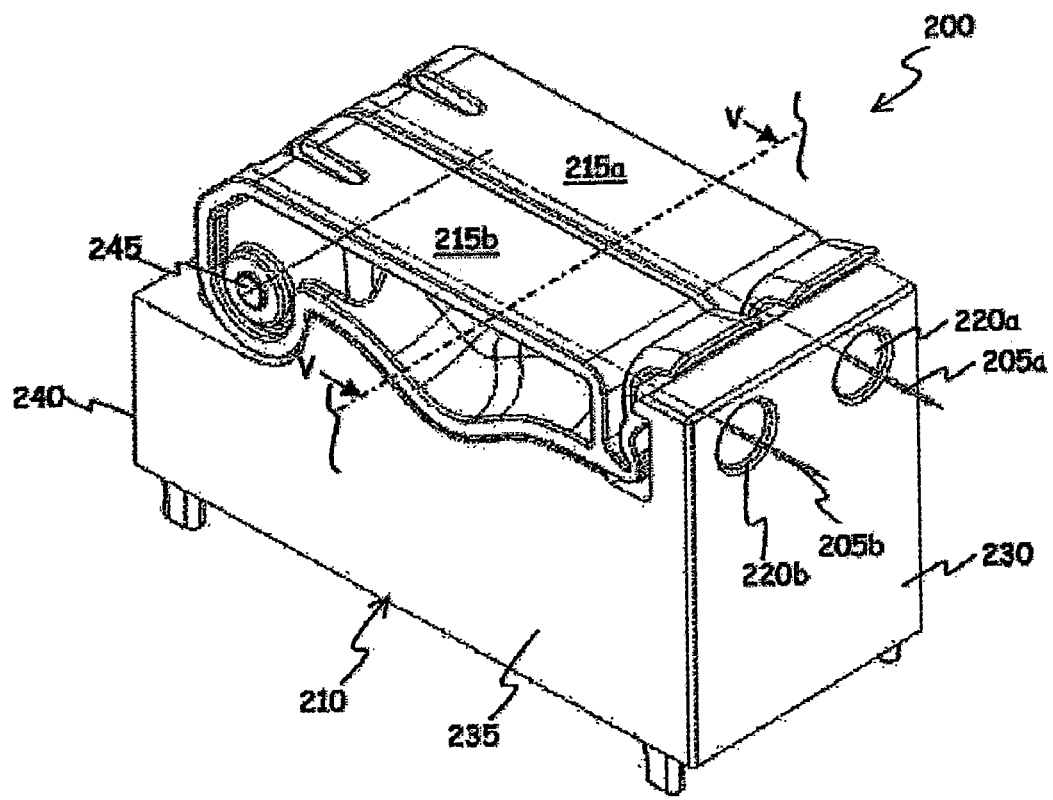
FIG. 2 shows, in axonometric view and in an optically active (closed) operating condition, a device for coupling a pair of optical fibers to respective opto-electronic devices, according to an embodiment of the present invention.
Figure 3:
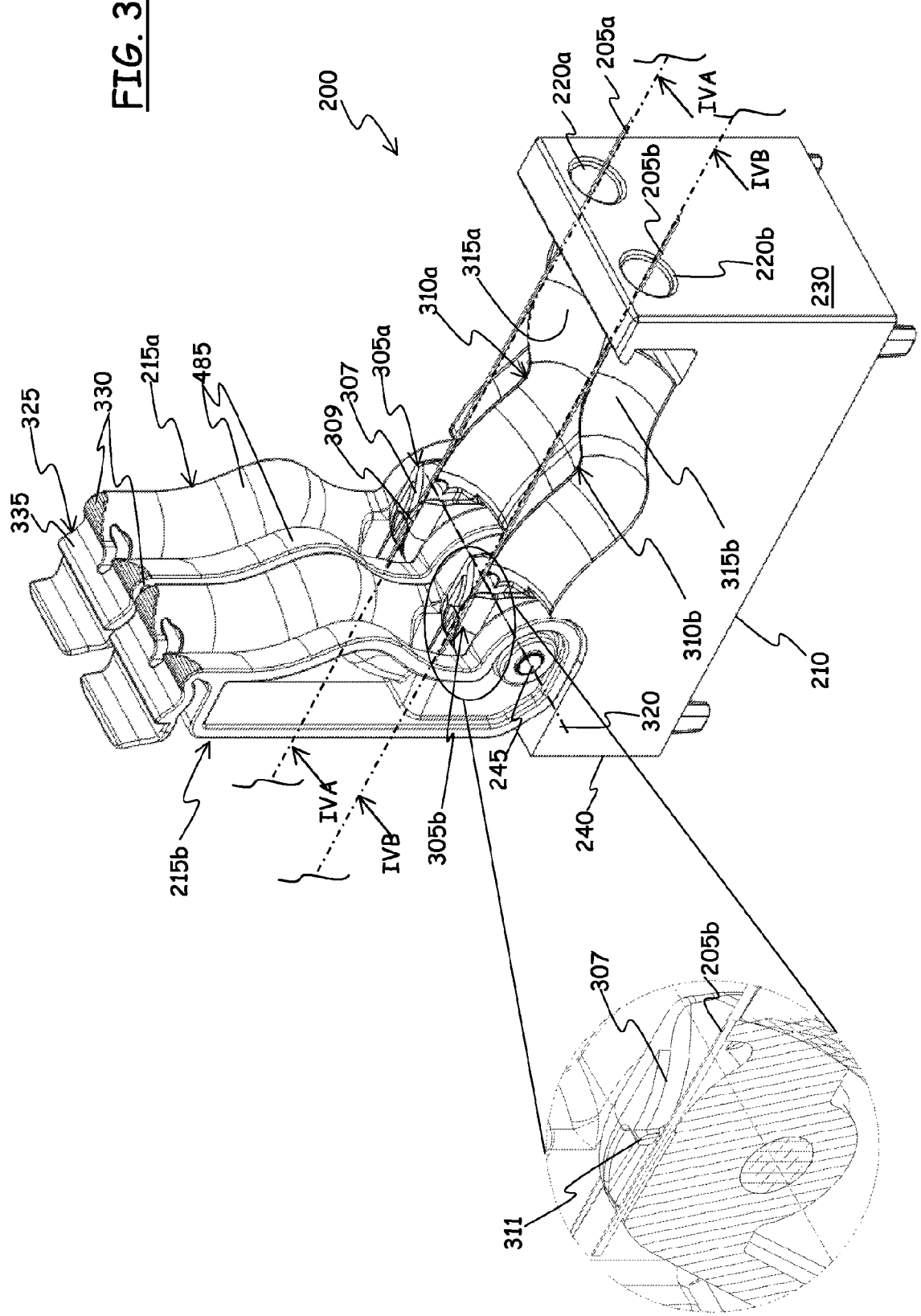
FIG. 3 shows the device of FIG. 2, again in axonometric view but in an optically inactive (open) operating condition.

FIGS. 2 and 3 show, in axonometric view, a device 200 for optically coupling the optical fibers to, in the embodiment herein considered, opto-electronic devices by fiber bending, according to an exemplary embodiment of the present invention; the device 200 is further shown in the other figures, which allow appreciating the construction and operating details of the device according to the herein presented invention embodiment.

In particular, the device 200 that is hereinafter described is adapted, in use, to optically couple a first optical fiber 205*a* to a photo-detector (spilling light from the fiber by bending) and a second optical fiber 205*b* to a light source (injecting light into the optical fiber by bending). It is pointed out that in alternative embodiments the coupling of an optical fiber to a photo-detector and the coupling of an optical fiber to a light source may be accomplished by means of distinct devices, at least one of which is based on the present invention, or by a same device a higher number of optical fibers may be coupled to respective opto-electronic devices, either photo-detectors, or light sources, or a mix thereof. The optical fibers 205*a*, 205*b* typically are multimode optical fibers, preferably high bandwidth optical fiber at least at a wavelength between about 600 nm and 1600 nm.

In FIGS. 2 and 3 the device 200 is depicted in two different operating conditions: an optically active (also referred to as "closed") operating conditions, in FIG. 2, and an optically inactive ("open") operating condition in FIG. 3.

Essentially, the device 200 is a clamp for the fibers 205*a* and 205*b*, and includes a clamp base 210, and a first and second fiber pressing members 215*a* and 215*b*, adapted to cooperate with the clamp base 210 to accommodate and clamp the first and second optical fibers 205*a* and 205*b* in a properly bent, curved condition, allowing efficient light extraction and, respectively, light injection.

Figure 4A:
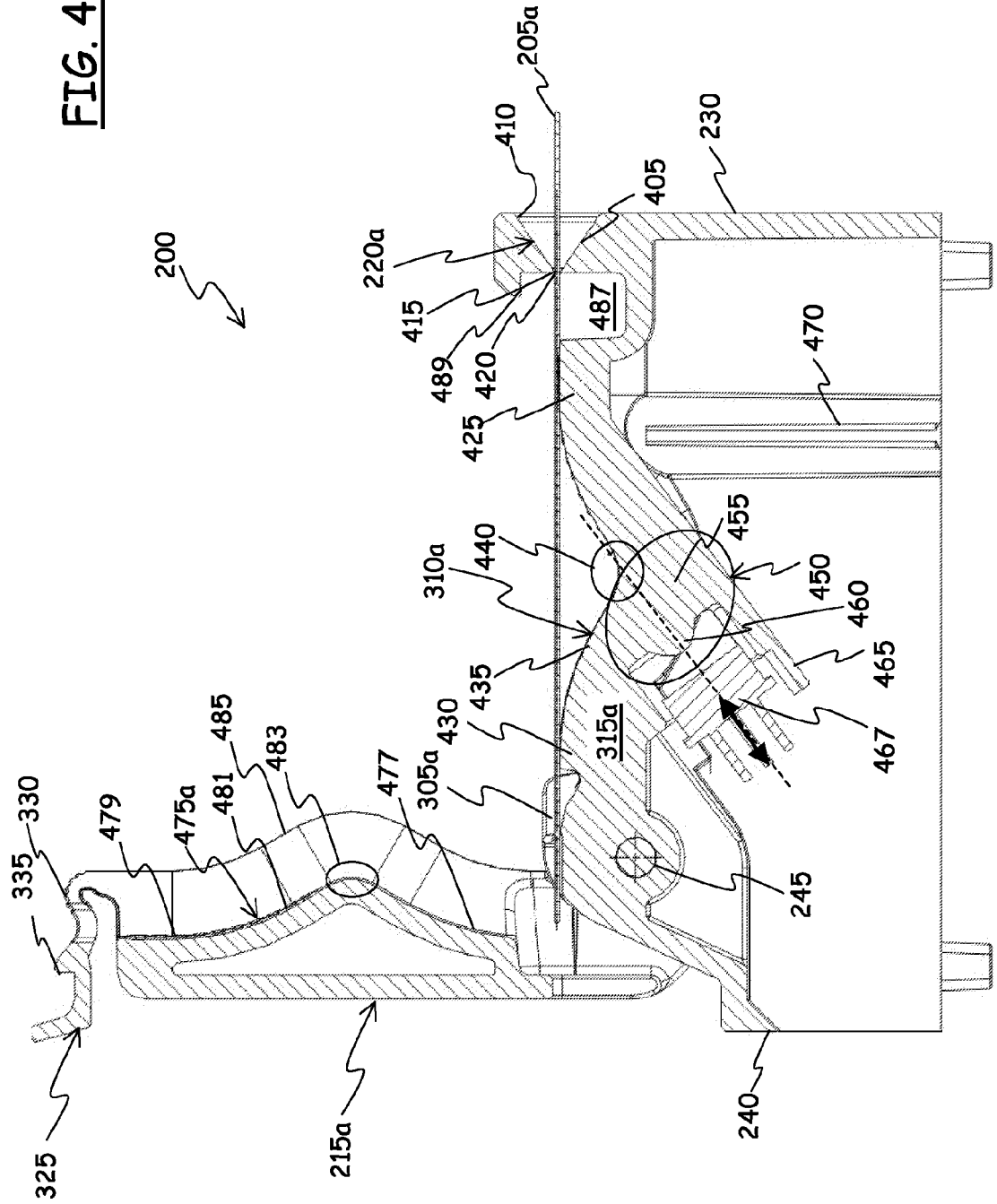
FIG. 4A shows the device of FIG. 3 in cross-sectional view taken along a sectional plane extending vertically and containing the line IVA-IVA of FIG. 3.
Figure 4B:
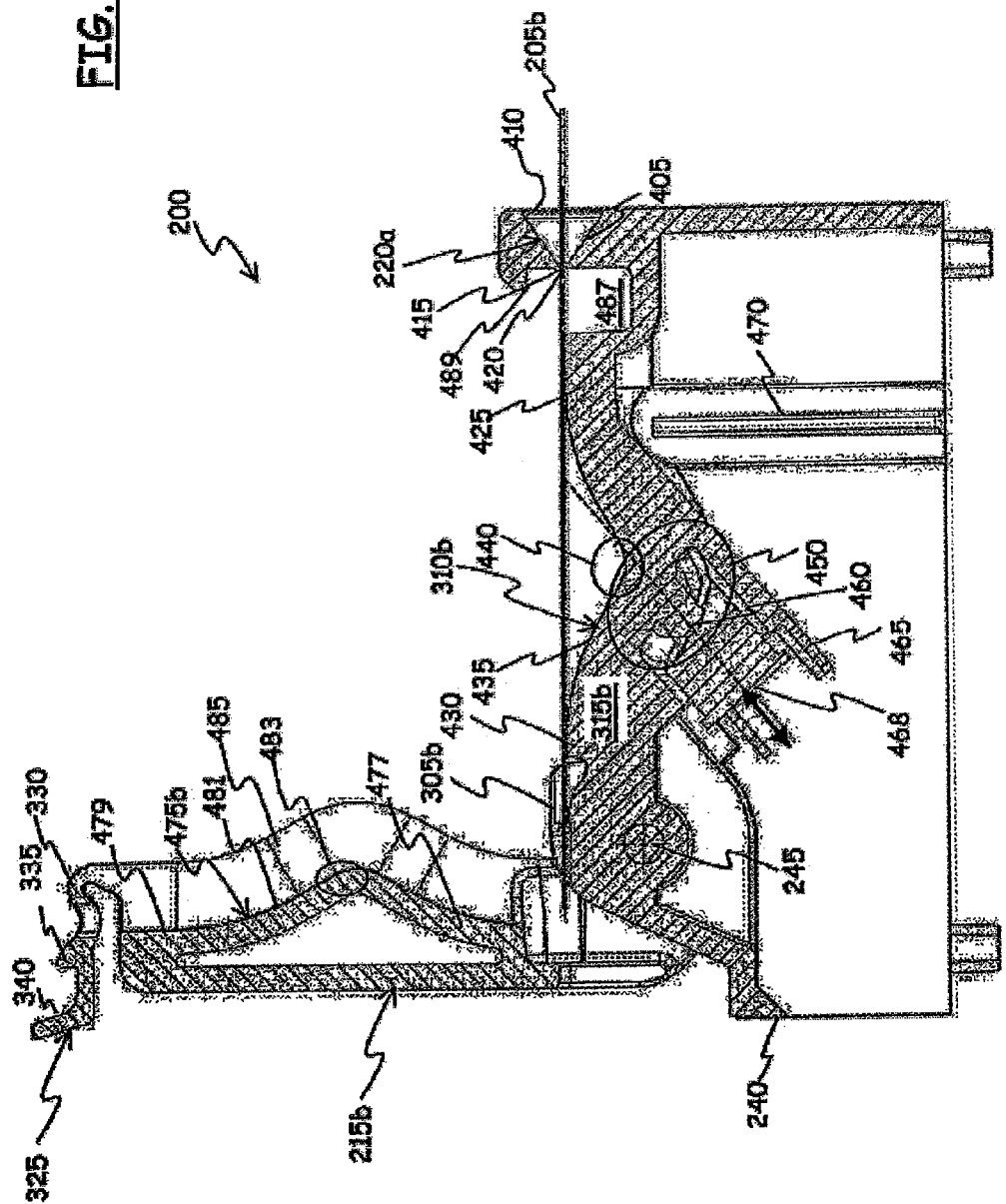
FIG. 4B shows the device of FIG. 3 in cross-sectional view taken along a vertical sectional plane containing the line IVB-IVB of FIG. 3.
Figure 5:
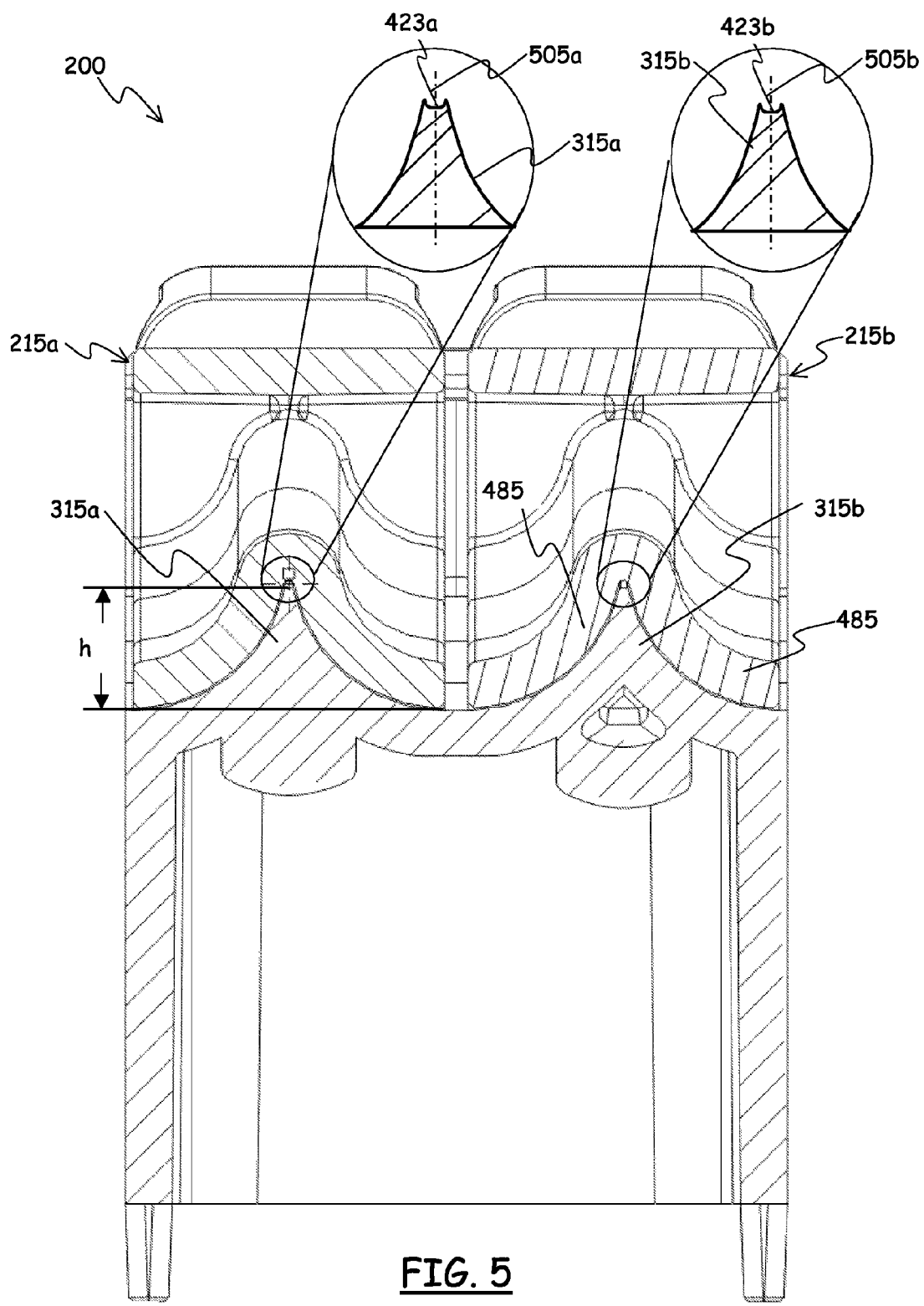
FIG. 5 shows the device of FIG. 2 in cross-sectional view taken along a vertical sectional plane containing the line V-V of FIG. 2.

FIGS. 4A and 4B show the device 200, in the inactive, open operating condition, in cross-sectional view taken along vertical (in the convention adopted in the drawings) sectional planes containing the lines IVA-IVA and, respectively, IVB-IVB, whereas FIG. 5 shows the device 200 in the active, closed operating condition, in cross-sectional view taken along the vertical sectional plane containing line V-V depicted in FIG. 2, and, in conjunction with FIGS. 2 and 3, allows appreciating the device construction. Further constructions details can be appreciated looking at FIGS. 7 and 8.

The clamp base 210 has the shape of a generic rectangular parallelepiped body, and is formed, at least partly, of a transparent material, particularly plastic, transparent to light in a wavelength range of interest. A suitable, commercially available material is for example Zeonex®, produced by Zeon Chemicals, which is an ultra-high purity, optical-grade polymer widely used in optical applications where refractive index stability over high heat and humidity is crucial.

The clamp base 210 includes, for each of the two optical fibers 205*a*, 205*b*, a fiber guided insertion structure adapted to facilitate the guided insertion of the optical fibers into the device and to properly position the optical fiber.

In an embodiment of the present invention, each of the fiber guided insertion structures includes in particular an input fiber guided insertion element and an output fiber guided insertion element, acting as fiber positioning elements.

The input fiber guided insertion element includes a through hole 220*a*, 220*b* formed in an upper portion of a front wall 230 of the clamp base 210 (it is pointed out that "up" and "down" are not to be intended in absolute sense, but merely in connection with the way the device is depicted in the drawings); the output fiber guided insertion element, as best visible in cross-section in the enlarged-scale detail in FIG. 3, includes a fiber passage 305*a*, 305*b*, essentially coaxial to the through hole 220*a*, 220*b*, formed near a distal end 240 of the clamp base 210 with respect to the front wall 230.

In particular, as clearly visible in FIGS. 4A and 4B, the through hole 220*a*, 220*b* has a flared, e.g. frustoconical portion 405, of prevalent length, terminating at a first, exposed surface of the front wall 230 in an enlarged, generically circular opening 410, having a diameter significantly larger than the outer diameter of the optical fibers 205a, 205b, and a shorter, essentially cylindrical neck portion 415, of diameter only slightly higher than the fiber outer diameter, which terminates in an opening 420 in a second surface of the front wall 230 opposite to the first surface. Thanks to the frustoconical portion 405, the through hole 220a, 220b forms a funnel that facilitates fiber insertion and directs the fiber into the neck portion 415.

In a preferred embodiment of the present invention, assuming for example that the optical fibers 205a, 205b have an outer coating diameter of approximately 250 μm (with a tolerance of 10 μm), the neck portion 415 of the through holes 220a and 220b may have a diameter ranging from approximately 260 μm to 500 μm. This allows achieving a fiber insertion angle (i.e., the admissible angle between the optical fiber during insertion and the neck portion axes) ranging from −90° to +90°, and a length greater than approximately 100 μm. In particular, the Applicant has experimentally found that through holes 220a, 220b with neck portions 415 having a diameter ranging from approximately 300 μm to approximately 400 μm, a length ranging from approximately 300 μm and 5000 μm, and an insertion angle ranging from approximately −60° to approximately +60°, the insertion of the optical fibers is rather facilitated.

In an embodiment of the present invention, the fiber passage 305a, 305b comprises a gap defined by a pair of curved wings 307 and 309 integrally formed with the body of the clamp base 210 and shaped so as to converge towards a through hole, of diameter slightly higher than the outer diameter of the optical fiber, formed in a relatively thin diaphragm 311, thereby forming another funnel that, like the funnel in the input fiber guided insertion element, facilitates fiber insertion.

The clamp base 210 further includes, for each of the two fibers 205a, 205b, a fiber bending structure 310a, 310b, extending longitudinally between the input and output fiber guided insertion elements of the fiber guided insertion structure. The fiber bending structure 310a, 310b includes a ridge 315a, 315b, integrally formed in the clamp base 210, having a suitably curved crest profile, with (as schematically shown in the enlarged detail of FIG. 5, and in FIG. 8) a generically half-circular groove 423a, 423b formed on top of the ridge 315a, 315b and running longitudinally along the ridge crest, i.e. the ridge summit, the groove 423a, 423b having diameter approximately equal to the optical fiber 205a, 205b outer diameter, the groove surface behaving in use as a fiber bending surface on which the optical fiber 205a, 205b is caused to lie (in the following, the groove 423a, 423b and its surface, that is, the fiber bending surface, will be denoted by the same reference numeral). In alternative configurations, the groove 423a, 423b may have other cross-sectional shapes, such as a circular arc segment smaller than the half circle, while maintaining the functional feature of being adapted to at least partly accommodate the fiber 205a, 205b.

In particular, the ridge crest includes two essentially flat portions 425 and 430, at the two longitudinal ends of the crest, respectively close to the input and output fiber guided insertion elements, and an upwardly concave portion 435, smoothly joining the two essentially flat crest portions 425 and 430. In an intermediate position along the concave crest portion 435, for example essentially at the center thereof, an active crest portion 440 has, in a cross section taken along the plane IVA-IVA, IVB-IVB (chosen as a longitudinally median plane of the fiber bending surface), a bending radius adapted to cause a fiber, accommodated within the groove 423a, 423b so as to lie on the fiber bending surface, to take a bent configuration adapted to achieve the desired spilling/injection of light from/into the fiber. In particular, as visible in the enlarged detailed of FIG. 7, the active crest portion 440 is an arc of a circumference having radius r of approximately 1 to 3 mm, preferably 2 mm±0.5 mm and an angular span β of approximately 30° to 90°, preferably 60°±10°; the remaining part of the concave portion 435 has, at any longitudinal position, a local bending radius greater than approximately 3 mm.

In the clamp base 210, associated with each of the fiber bending structures 310a and 310b, an optical coupling structure 450 is formed below the active crest portion 440; each of the two optical coupling structures 450 includes a respective portion of the clamp base 210 made in a transparent material (at least at the operating optical wavelengths of interest), and preferably with a refraction index approximately equal to that of the fiber primary coating (for example, a typical fiber primary coating refraction index is 1.4795 at 598 nm, and 1.4693 at 1320 nm). As mentioned in the foregoing, a suitable material is Zeonex®. In an embodiment of the present invention, the whole clamp base 210 is made of the same transparent plastic material having the above-mentioned optical properties, however nothing prevents that only the clamp base portions forming the optical coupling structures 450 are made in such a material, and the remaining portions of the base clamp 210 are instead made of a different material, not necessarily having the above mentioned optical properties, and possibly even not transparent.

In an embodiment of the present invention, each of the two optical coupling structures 450 also includes at least one lens 460, adapted to gather and focus the light extracted from, or to be injected into the optical fiber 205a or 205b. In a preferred embodiment of the present invention, the lenses 460 are integrally formed in the clamp base 210, however nothing prevents from providing the lenses 460 as separate parts, that are mounted to the clamp base 210.

Below each of the lenses 460, a mechanical holdering structure 465, adapted to removably house a respective opto-electronic device, is formed in the clamp base 210. In particular, since most of the commercially available opto-electronic devices are contained in generically cylindrical standard packages of the "TO-can" type, each of the two mechanical holdering structures 465 includes a generically cylindrical hollow seat, of inner diameter essentially equal to the outer diameter of the TO-can package, so as to be adapted to accommodate the opto-electronic device and to retain it in position by simple friction.

In particular, in the exemplary invention embodiment herein described, the holdering structure 465 associated with the fiber bending structure 310a is adapted to house a photodetector, in the drawings depicted as mounted to the device 200 and indicated by 467, e.g. a PIN photodiode, whereas the holdering structure 465 associated with the fiber bending structure 310b is adapted to house a light source, in the drawings depicted as mounted to the device 200 and indicated by 468, like a laser, for example an FP laser or a VCSEL, or a photodiode.

It is pointed out that nothing prevents from making holdering structures of different shapes, adapted to house opto-electronic components in packages of different shapes and sizes.

Figure 7:
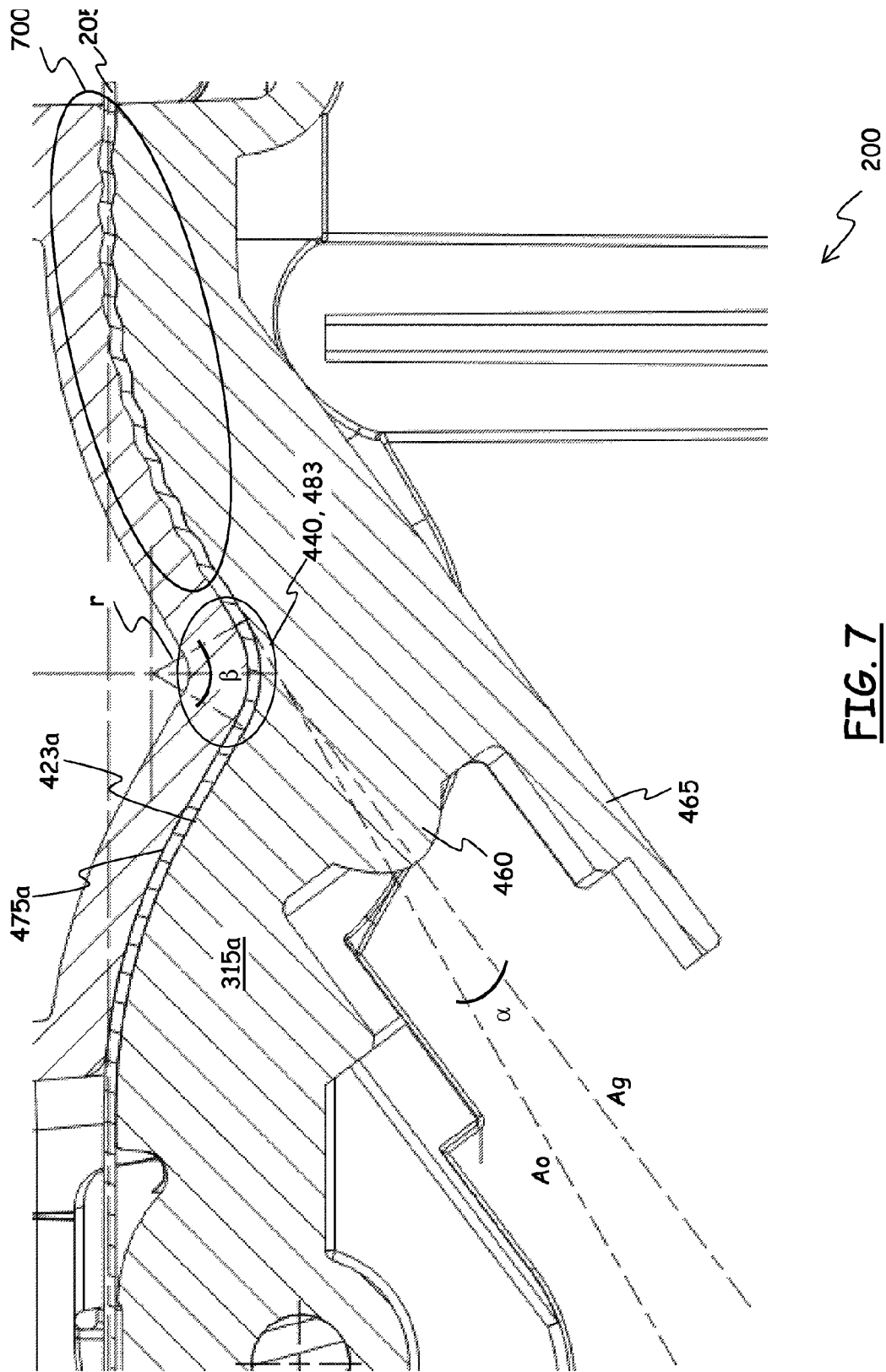
FIG. 7 is an enlarged detail of the device shown in FIG. 6B.
Figure 8:
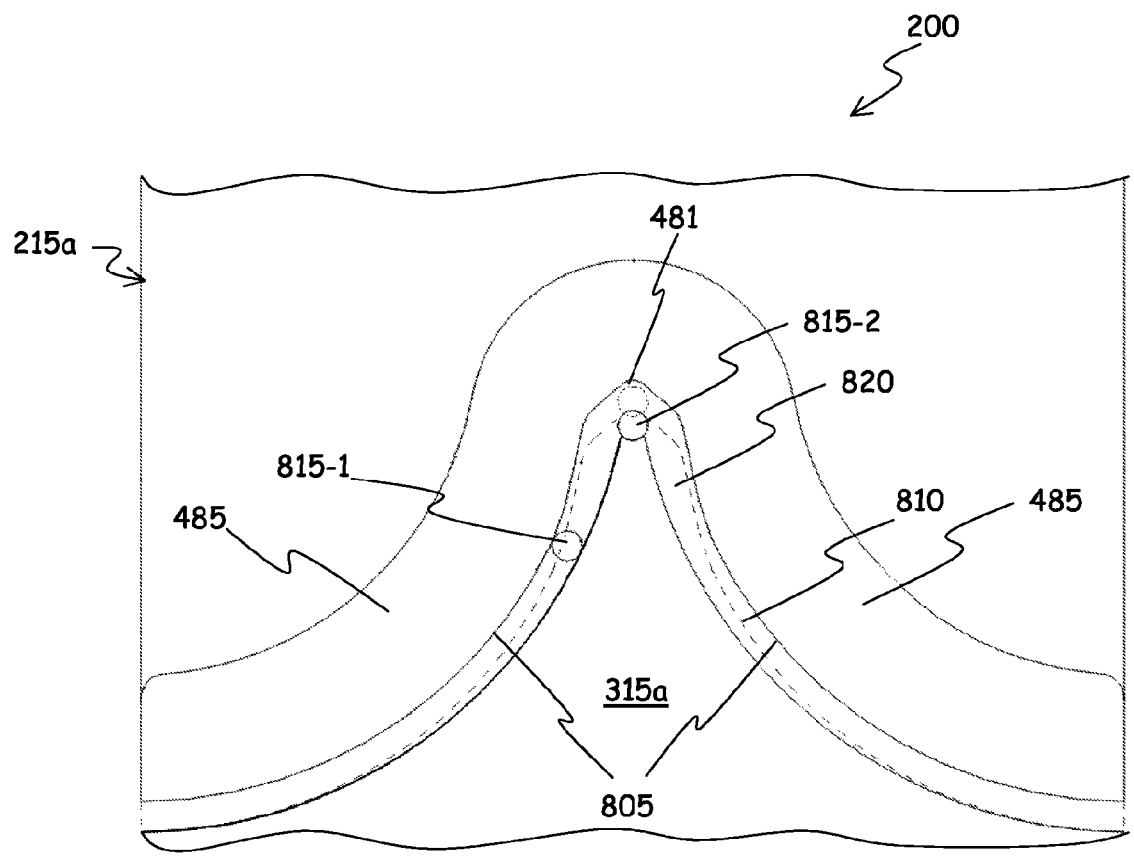
FIG. 8 shows, in cross section taken along the line VIII-VIII, a detail of the device of FIG. 6B.

In particular, as visible in FIG. 7, the geometrical axis Ag of the cylindrical seat of the associated holdering structure 465 is aligned to the axis of the respective lens 460, which is in turn aligned to form a suitable angle with respect to an optical axis Ao of the respective optical coupling structure 450, the optical axis of the optical coupling structure 450 being defined as the tangent to the bending surface 423a, 423b (on the median plane thereof) at the beginning, for the receiver section, or at the end, for the transmission section (in the direction of light propagation), of the active crest portion 440. The suitable angle (denoted α in FIG. 7) between the geometric axis and the optical axis are preferably different for the two associated fiber bending structures 310*a* (designed to extract light from the fiber 205*a*) and 310*b* (designed for injecting light into the fiber 205*b*). In particular, and merely by way of example, for the fiber bending structure 310*a* the angle α may range from −20° to 30°, preferably from 0° to 20°, even more preferably from 3° to 10°, for example from 6° to 7°; for the fiber bending structure 310*b* the angle α may range from −20° to 20°, preferably from 5° to 11°. The Applicant has found that the above ranges of angle values maximize the light extraction/injection.

The clamp base 210 finally includes a mounting assembly adapted to enable the mounting of the device 200 to a support. In particular, according to an embodiment of the present invention, the mounting assembly includes two integrally-formed hollow cylindrical elements 470, positioned along two opposite lateral walls 235 of the clamp base body 210 approximately midway between the front wall 230 and the distal end 240 of the clamp base body 210, and adapted to be engaged by a threaded portion of, e.g., a screw. For example, in an embodiment of the present invention, the length of the cylindrical elements 470 ranges from 1 to 15 mm, preferably from 5 to 10 mm, and the diameter of the internal holes ranges from 0.5 to 4 mm, preferably from 1.5 to 2.5 mm. It is pointed out that the number, location and size of the hollow cylindrical elements 470 may greatly vary, depending for example on contingent needs.

In one embodiment, each of the fiber pressing members 215*a* and 215*b* includes a lever, e.g. in plastic (not necessarily transparent) material, hinged, essentially at one of the two ends thereof, to the clamp base 210, e.g. by means of pivot(s) 245, and able to rotate around an axis transversal to, in particular essentially perpendicular to, a median plane 505*a*, 505*b* (coinciding for example with the plane IVA-IVA, IVB-IVB of FIG. 3) of the groove 423*a*, 423*b* extending longitudinally thereto, particularly, in the embodiment herein described, a plane of symmetry of the groove extending centrally thereto (however, in alternative embodiments of the invention, the median plane need not be a symmetry plane, and the grooves may be asymmetric). In the example shown, the two levers of the fiber pressing members are rotatable around a same axis 320, but this is not to be construed as limitative to the present invention. In particular, the hinges of the two levers of the fiber pressing members 215*a*, 215*b* are positioned generally below the respective fiber passage 305*a*, 305*b*.

It is pointed out that the use of hinges including pivots is not per-se limitative to the present invention, and that alternative solutions for enabling rotation of the fiber pressing members relative to the clamp base may be adopted, such as for example a connection of the fiber pressing members to the clamp base by means of a resilient diaphragm.

Each of the fiber pressing members 215*a*, 215*b* has a fiber pressing surface 475*a*, 475*b* having a median plane essentially coplanar to the median plane 505*a*, 505*b* of the fiber bending surface 423*a*, 423*b* and adapted to cooperate with the associated surface 423*a*, 423*b* of the groove formed on top of the ridge 315*a*, 315*b*. In particular, the fiber pressing surface 475*a*, 475*b* has two essentially longitudinally flat portions 477 and 479, at the two ends of the fiber pressing surface 475*a*, 475*b*, respectively close to the hinged end of the fiber pressing member 215*a*, 215*b* and to the opposite, free end of the lever, and a convex portion 481 smoothly joining the two essentially flat portions 477 and 479. In an intermediate position along the convex fiber pressing surface portion 481, particularly essentially at the center thereof, an active fiber pressing surface portion 483 is provided, having a bending radius essentially equal to the bending radius of the active crest portion 440 and adapted to cooperate with the latter to cause clamping of the optical fiber 205*a*, 205*b* in a bent condition such as to achieve the desired spilling/injection of light from/into the fiber.

The fiber pressing surface 475*a*, 475*b* is surrounded, at both sides thereof, by a couple of longitudinally extending material lips 485. The two lips 485 form walls that define therebetween a channel 805 having, in transversal cross section, a generically "U" shape, of width sufficient to accommodate thereinside at least the upper portion of the ridge 315*a*, 315*b*, including the ridge crest with the groove 423*a*, 423*b*. The fiber pressing surface 475*a*, 475*b* lies on the bottom surface of the channel 805.

Figure 6A:
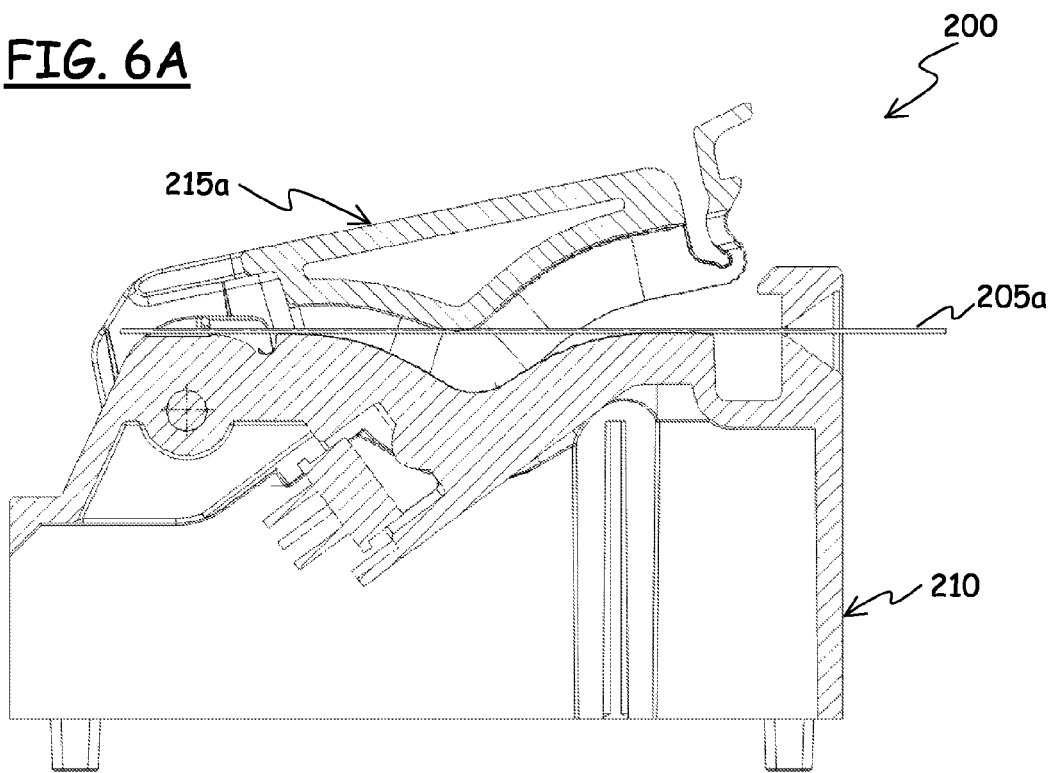
FIGS. 6A and 6B show the device in cross-sectional view taken along the same sectional plane as in FIG. 4, but in a condition intermediate between the inactive and the active operating conditions, and in the active operating condition, respectively.
Figure 6B:
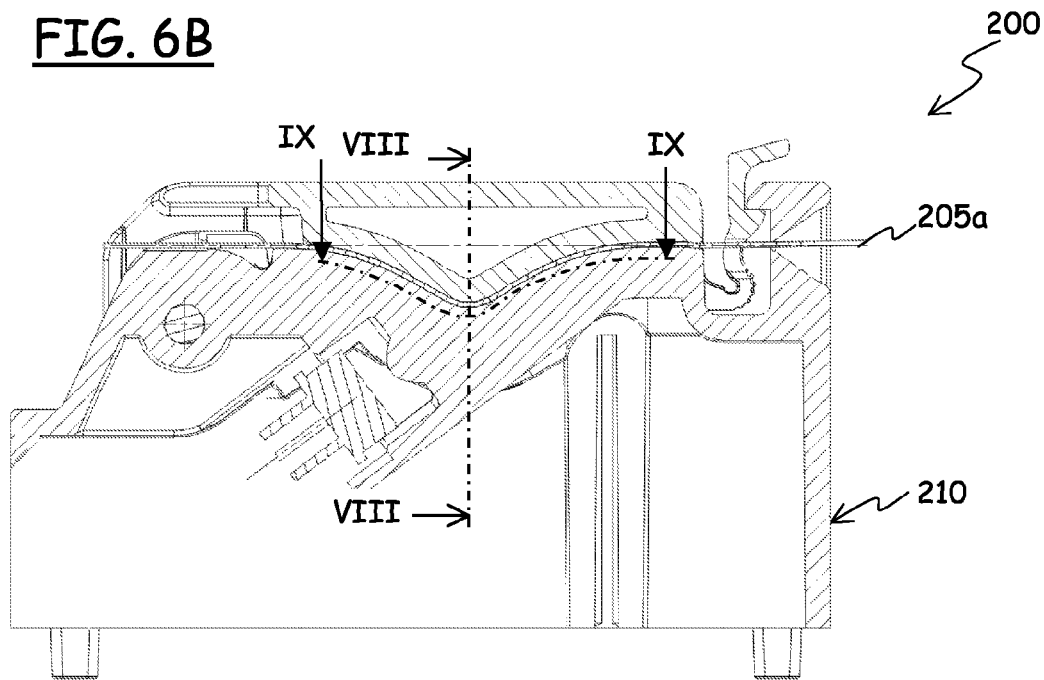
Figure 9:
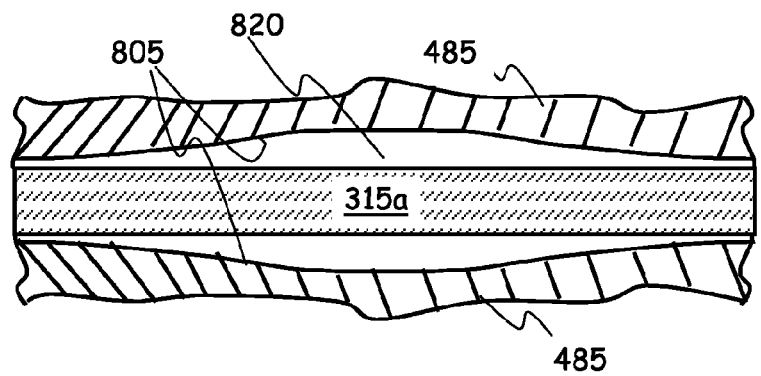
FIG. 9 is a sectional view taken along the line IX-IX of FIG. 6B.
Figure 10A:
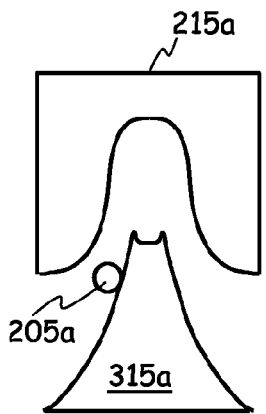
FIGS. 10A to 10E are schematic cross-sectional view similar to that of FIG. 8, taken at different operating conditions of the device.
Figure 10B:
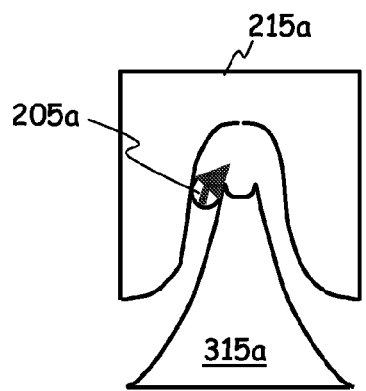
Figure 10C:
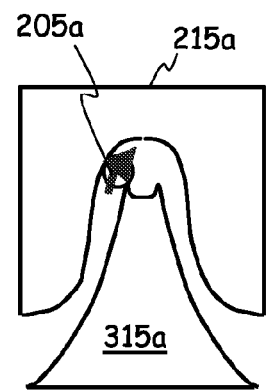
Figure 10D:
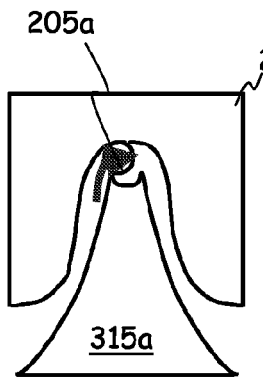
Figure 10E:
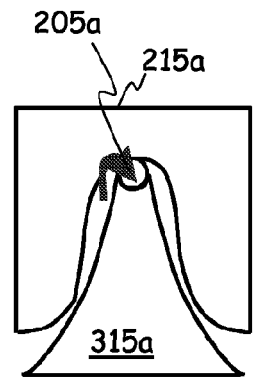

In a preferred embodiment of the present invention, the cross sectional shape and size of the channel 805 vary longitudinally in going from the essentially flat portion 477 to the essentially flat portion 479 of the fiber pressing surface 475*a*, 475*b*. In particular, FIG. 9 is a schematic sectional view of the device 200 taken for illustrative purpose along the ideal surface represented in FIG. 6B by the line IX-IX, below the ridge crest of approximately ⅓ of the total height h (FIG. 5) of the ridge: in the flat portion 477, which, when the fiber pressing member 215*a*, 215*b* is lowered (device 200 in the active operating condition), is located in correspondence of the fiber passage 305*a*, 305*b*, the shape of the channel 805 in cross section is essentially complementary to the cross-sectional shape of (at least the upper part of) the ridge 315*a*, 315*b*, so that, when the fiber pressing member 215*a*, 215*b* is pressed and brought into the closed position, the ridge 315*a*, 315 essentially tightly fits within the channel 805. Moving along the fiber pressing surface 475*a*, 475*b* towards the active pressing surface portion 483, the cross-sectional shape of the channel 805 changes, such that, as also visible in the cross-sectional view of FIG. 8, when the fiber pressing member 215*a*, 215*b* is in the closed position, a width of a gap 820 between the surface of the channel 805 and the surface of the ridge 315*a*, 315*b* near the bottom of the ridge is less than a width of the gap 820 between the surface of the channel 805 and the surface of the ridge 315*a*, 315*b* near the top of the ridge; in other words, when device 200 is closed, the gap 820 between the surface of the channel 805 and the surface of the ridge 315*a*, 315*b*, of essentially zero width at the bottom of the ridge, smoothly widens in going towards the top of the ridge. In particular, in FIG. 8 the fiber pressing member 215*a* is depicted in solid line in an almost, but not yet totally closed position, whereas the dashed line 810 shows the profile of the surface of the channel 805 when the fiber pressing member 215*a* is totally lowered, in the closed position; the optical fiber 205*a* is depicted in solid line in two positions 815-1 and 815-2: an initially unaligned position 815-1, partially down the crest of the ridge 315*a*, and a final, centered position 815-2, within the groove 423*a*, 423*b*, to which the fiber is brought thanks to the self-centering action of the fiber pressing member and of the ridge, as explained in greater detail later.

At the end opposite to the hinge, each fiber pressing member 215*a*, 215*b* has a flexible projection 325, with a central passage for the optical fiber. The flexible projection 325 has a knurled exposed surface 330, for improving flexibility, a protruding tooth 335 and a grasp appendix 340. The flexible projection 325 is adapted to snap-fit engage a groove 487 formed in the front wall 230 of the clamp base 210, and the tooth 335 is adapted to cooperate with a shoulder 489 projecting from the front wall 230 so as to retain the fiber pressing member in the closed position.

In a preferred embodiment of the present invention, as best visible in FIG. 7, a mode scrambling structure 700 is formed in the fiber bending surface 423a, in the concave portion 435 between the active surface portion 440 and the essentially flat surface portion 425 near the clamp base front wall 230, i.e., in the direction of propagation of the light within the optical fiber 205a, upstream the area of extraction of the light from the fiber. The mode scrambling structure includes a regular, i.e. periodic, or irregular succession of corrugations of the fiber bending surface 423a of the structure 310a; complementary corrugations are formed in the fiber pressing surface 475a. The corrugations causes the fiber, when clamped, to be similarly corrugated, and are adapted to increase the light extraction efficiency by exciting higher-order light propagation modes of a multi-mode optical fiber 205a, and thus promoting the diffusion of the light towards the fiber cladding, thereby facilitating the escaping of light corresponding to the higher-order propagation modes. In an embodiment of the present invention, a similar mode scrambling structure may be provided in the transmitting part of the device. In the transmitting device, the mode scrambling structure allows making essentially uniform the distribution of the injected optical power between the modes of the fiber core (which can be advantageous for ensuring the high fiber transmission performance in cases where the light injection arrangement is only able to excite those modes having insufficient performance).

The Applicant has found that the mode scrambling structure 700 should preferably be such that the fiber bending radii caused by the corrugations should be not lower than the bending radius in the light extraction area, typically ranging from 2 to 20 mm. The Applicant has found that in order to maximize the effect on the optical power distribution while minimizing the attenuation and the length of the corrugated section, the minimum curvature radius of the corrugations should be 0.5 mm, the profile of the corrugated section should be sinusoidal and with a period of 1 mm (i.e., the distance between two successive corrugation crests or throats is 1 mm), and the corrugated section should have a length ranging from 6 to 10 mm.

The opto-electronic devices 467 and 468 may be inserted into the respective holdering structures 465 either manually or by means of placing machines, and this operation needs not be accomplished on field. Thus, the device 200 may be supplied ready for the electrical and optical interconnections.

During installation operation, after having brought the fiber pressing members 215a and 215b into the open position (like in FIG. 3), the operator, possibly also the end user, slips the fiber 205a, 205b into the through hole 220a, 220b, respectively, causing the fiber to exit from the opening 420; this operation is facilitated by the funnel shape of the frustoconical portion 405 of the through hole 220a, 220b. Then, the operator continues to push the fiber until it enters the fiber passage 305a, 305b, also facilitated by the funnel-defining shaping of the wings 307 and 309. In this way, the fiber 205a, 205b is correctly positioned and aligned to the fiber bending structure 310a, 310b, and extends substantially straight between the input and output fiber insertion elements.

Then, the operator, acting on the free end of the fiber pressing member 215a, 215b, opposite to the hinged end thereof, pushes down the fiber pressing member 215a, 215b, causing it to rotate around the rotation axis 320; in this way, the fiber pressing surface 475a, 475b approaches the crest of the ridge 315a, 315b.

In the rotational movement of the fiber pressing member 215a, 215b towards the crest of the ridge 315a, 315, the fiber 205a, 205b enters the channel 805 between the two lips 485, until the fiber pressing surface 475a, 475b intercepts the optical fiber 205a, 205b. In particular, the fiber pressing member 215a, 215b behaves as a lever of the second type (i.e., a lever wherein the reactive force is locate intermediate between the lever fulcrum and the point of application of the force) and, due to the peculiar shape of the fiber pressing surface 475a, 475b, the latter intercepts the optical fiber 205a, 205b in a position (FIG. 6A) along the convex portion 481, near the active portion 483 thereof, but displaced towards the hinged end of the fiber pressing member 215a, 215b.

As the fiber pressing member 215a, 215b is pressed further towards the clamp base 210, the optical fiber 205a, 205b, initially extending substantially straight between the input and output fiber insertion elements, is bent towards the fiber bending structure 310a, 310b.

Continuing to push the fiber pressing member 215a, 215b, the optical fiber 205a, 205b is accommodated into the groove 423a, 423b and clamped between the fiber pressing surface 475a, 475b and the groove 423a, 423b surface. After the fiber pressing member 205a, 205b has been completely lowered, it can be locked in the closed position by acting on the flexible projection 325, causing it to snap-fit engage the groove 487: the tooth 335, abutting against the shoulder 489, retains the fiber pressing member in the closed position.

In particular, thanks to the fact that the fiber pressing member 215a, 215b behaves as a lever of the second type, the optical fiber 205a, 205b, initially contacted by the fiber pressing surface 475a, 475b in a point between the active surface portion 483 of the fiber pressing surface 475a, 475b and the output fiber guided insertion element, gets progressively contacted by the fiber pressing surface 475a, 475b in the remaining fiber portion, towards both the input and the output fiber guided insertion element, and eventually clamped between the fiber pressing surface 475a, 475b and the fiber bending surface 423a, 423b along the whole fiber length from the output fiber guided insertion element to the input fiber guided insertion element (particularly, a fiber length not only including the relatively short fiber portion to be properly bent for extracting/injecting light, but also adjacent fiber portions). This allows a precise, correct positioning of the optical fiber within the groove 423a, 423b formed in the crest of the ridge 315a, 315b, adherent to the surface thereof, without leaving possible air gaps between the optical fiber and the surface of the groove 423a, 423b, and without corrugations, that, especially in the active portion 440 of the fiber bending surface 423a, 423b, would easily alter the fiber bending radius to an extent such as to unacceptably lower the optical coupling properties.

Figure 11A:
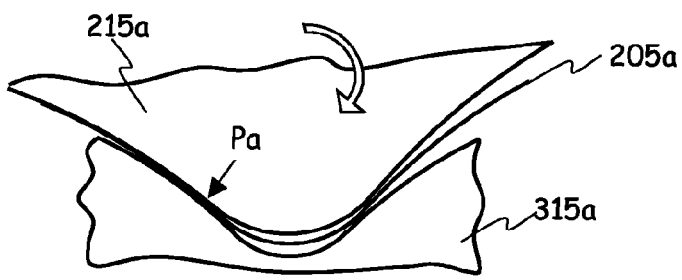
FIGS. 11A and 11B are schematic drawings pictorially showing an advantage of the device of the present invention compared to a device operating according to the prior art.

In fact, even though ideally the clamping of the fiber between the fiber pressing surface 475a, 475b and the fiber bending surface 423a, 423b takes place essentially simultaneously along the whole fiber length from the output fiber guided insertion element to the input fiber guided insertion element, inevitable, even if small, mismatches between the shape of the fiber pressing surface 475a, 475b and the fiber bending surface 423a, 423b, and/or surface irregularities, cause certain points of the optical fiber to be pinched first than other. However, as schematically depicted in FIG. 11A (wherein a possible small mismatch in shape of the fiber pressing surface and the fiber bending surface has been greatly exaggerated, for pictorial purposes), thanks to the rotational movement of the fiber pressing member 215a, 215b, in the device according to the present invention the fiber may get first pinched in a point Pa that, compared to the active portion 440 of the fiber bending surface 423a, 423b is displaced towards the output fiber guided insertion element; thus, the further lowering of the fiber pressing member 215a, 215b does not induce stresses into the fiber, because the fiber portions from the pinching point Pa towards the input fiber guided insertion element are still not clamped and thus it is free, when clamped, from frozen stress.

Figure 11B:
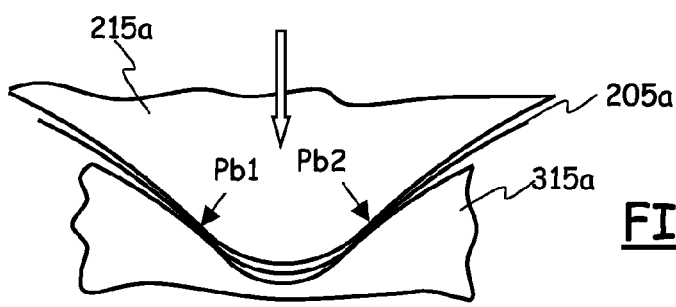

On the contrary, as depicted in FIG. 11B (wherein, similarly to FIG. 11A, a possible small mismatch in shape of the fiber pressing surface and the fiber bending surface has been greatly exaggerated, for pictorial purposes), if, as in the prior-art devices, the fiber pressing member were lowered with a simple translation movement, it may occur that the fiber is pinched in two points Pb1, Pb2 at both sides of the center of the active portion 440, with the consequence that the further lowering of the fiber pressing member imparts stresses in the fiber portion between the two pinching points Pb1, Pb2, stresses than cannot be relieved, and that may cause fiber corrugations, or the fiber may not perfectly adhere to the fiber bending surface 423a, 423b. This impairs the optical performance of the device.

Additionally, the peculiar shape of the channel 805 may advantageously perform a self-centering action on the optical fiber. As schematically depicted in FIGS. 10a to 10E, let it be assumed that the optical fiber 205a, 205b (in the drawings, only the fiber 205a is considered), albeit correctly positioned in correspondence of the input and output fiber guided insertion elements, does not extend perfectly straight therebetween. It is observed that this is far from a rare situation in the practice, because even small tensions and/or torques on sections of the optical fiber upstream the section of fiber within the device 200 may induce fiber warps that cause the fiber not to be correctly aligned with the median plane 505a, 505b of the fiber bending surface 423a, 423b.

The peculiar shape and size of the channel 805 ensures that, as the fiber pressing member 215a, 215b is lowered, the surface of the lips 485 and of the surface of the ridge 315a, 315b perform a combined action of upward thrust on the optical fiber, which action tends to bring the fiber into the groove 423a, 423b before the fiber gets clamped between the fiber bending surface 423a, 423 band the fiber pressing surface 475a, 475b.

The device disclosed is simple in construction and easy to use, not having separate parts to be assembled by the operator. It ensures a correct positioning of the optical fibers, adapted to guarantee a high power budget in the extraction/injection of light by fiber bending.

The present invention has been disclosed by describing an exemplary embodiment thereof, however those skilled in the art, in order to satisfy contingent needs, will readily devise modifications to the described embodiment, as well as alternative embodiments, without for this reason departing from the protection scope defined in the appended claims.

For example, although in the described embodiment the ridge with the slot on top for accommodating the optical fiber is provided on the clamp base, and the fiber pressing surface is the bottom surface of a channel formed on the fiber pressing member, in alternative embodiments the arrangement of parts may be reverted. In particular, from the manufacturing viewpoint, providing the ridge with the slot for accommodating the optical fiber on the fiber pressing member, and the fiber pressing surface as the bottom surface of a channel formed in the clamp base may be advantageous in terms of simplicity of the mould, particularly as far as the formation of the groove is concerned.

Furthermore, the output fiber guided insertion element, instead of being formed on the clamp base, may be formed on the fiber pressing member, proximate to the hinge (in such a case, the inactive operating condition of the device, in which the fiber is inserted thereinto, may correspond to a partially lowered condition of the fiber pressing member(s)).

It is pointed out that several of the above-described preferred embodiments of the present invention are suitable to be individually enucleated and applied in other contexts.

For example, the integration of one or more lenses in the optical coupling structures is per-se advantageous, as well as the provision of the integrated mode scrambling structure, and the preferred ranges of values, for example for the angles between the geometric axes and the optical axes are also per-se advantageous.

As already mentioned, the technique of the present invention, described in connection with the coupling of optical fibers to opto-electronic devices, may also be applied to the coupling of two optical fibers; to this purpose, the device described in the foregoing may be modified so as to be adapted to accommodate two optical fibers and keep them in suitable bent conditions, with the areas of light extraction/injection properly positioned with respect to one another so that light extracted from one fiber is coupled and injected into the other fiber.

Furthermore, nothing prevents that, in alternative embodiments of the invention, the relative movement of the fiber bending surface and the fiber pressing surface is or includes a rototraslation.

The invention claimed is:

1. A device for coupling an optical fiber, comprising:
    a first surface and a second surface, the first and second surfaces comprising respective active surface portions;
    a ridge having a groove longitudinally extending along the top of the ridge, wherein said second surface lies on the groove; and
    at least one optical fiber positioning element adapted to position at least one point of an optical fiber on a longitudinally median plane of said second surface, wherein the first and second surfaces are movable relative to each other between a first and a second relative position, the first and second surfaces, when in the second relative position, cooperating to accommodate a section of the optical fiber therebetween, so that the first and second active surface portions cooperate to keep the optical fiber in a predetermined bent condition; and
    wherein, in at least a part of the relative movement from the first to the second relative positions, the first surface rotates with respect to the second surface around a rotational axis oriented transversally with respect to said median plane.

2. The device of claim 1, wherein said predetermined bent condition is adapted to enable extraction or injection of optical energy from or into the optical fiber.

3. The device of claim 2, further comprising an optical coupling structure integrally formed with either one of said first and second surfaces.

4. The device of claim 3, wherein said optical coupling structure comprises a transparent material, or Zeonex®.

5. The device of claim 4, further comprising a light focusing element integrally formed with said optical coupling structure.

6. The device of claim 5, wherein, when said predetermined bent condition is adapted to extract optical energy from the optical fiber, an angle formed between an axis of said light focusing element and an optical axis of said optical coupling structure is −20° to 30°, 0° to 20°, 3° to 10°, or 6° to 7°.

7. The device of claim 5, wherein, when said predetermined bent condition is adapted to inject optical energy from the optical fiber, an angle formed between an axis of said light focusing element and an optical axis of said optical coupling structure is −20° to 20°, or 5° to 11°.

8. The device of claim 5, further comprising a seat adapted to accommodate an opto-electronic device in optical coupling relationship with said optical coupling structure.

9. The device of claim 8, wherein, when said predetermined bent condition is adapted to extract optical energy from the optical fiber, an angle formed between an axis of said light focusing element and an optical axis of said optical coupling structure is −20° to 30°, 0° to 20°, 3° to 10°, or 6° to 7°, and said seat is adapted to accommodate a photodetector responsive to the optical energy extracted from the optical fiber.

10. The device of claim 8, wherein, when said predetermined bent conditions is adapted to inject optical energy from the optical fiber, an angle formed between an axis of said light focusing element and an optical axis of said optical coupling structure is −20° to 20°, or 5° to 11°, and said seat is adapted to accommodate a light source for injecting light into the optical fiber.

11. The device of claim 2, further comprising, along at least one of said first and second surfaces, a mode scrambling structure.

12. The device of claim 11, wherein said mode scrambling structure comprises a succession of complementary corrugations formed in said first and second surfaces and adapted to corrugate a portion of the optical fiber when clamped between the first and second surfaces.

13. The device of claim 12, wherein said mode scrambling structure is located proximate to one of the active surface portions.

14. The device of claim 1, comprising a pair of walls defining a channel therebetween, wherein said first surface lies on a bottom surface of the channel.

15. The device of claim 14, wherein one of said ridge or said channel is formed on a clamp body, and one of said ridge or said channel is formed on a fiber pressing member coupled to the clamp body so as to be rotatable relative to the clamp body around said rotational axis.

16. The device of claim 15, wherein said fiber pressing member is hinged to the clamp body by means of a pivot.

17. The device of claim 15, wherein said at least one optical fiber positioning element comprises two optical fiber positioning elements, at least one of said two optical fiber positioning elements being formed in said clamp body substantially at a respective longitudinal end of said first surface.

18. The device of claim 17, wherein the two optical fiber positioning elements are formed in said clamp body substantially at respective longitudinal ends of said first surface.

19. The device of claim 17, wherein one of said two optical fiber positioning elements is formed in the fiber pressing member at a position proximate to said rotational axis.

20. The device of claim 15, further comprising a locking arrangement activatable to lock the fiber pressing member in the second relative position.

21. The device of claim 14, wherein, at the second relative position, a gap is defined between said walls and said ridge at least in correspondence with said active surface portions, said gap increasing in width when moving along a portion of said walls toward the channel bottom surface.

22. The device of claim 21, wherein said gap, at a given height along the walls, increases in width when moving from a position proximate to the at least one optical fiber positioning element toward a position in correspondence of one of the active surface portions.

23. The device of claim 1, wherein one of the first and second surfaces is pivotally mounted with respect to the other of the first and second surfaces, so as to form a lever.

24. A method of coupling an optical fiber, comprising:
providing a first surface and a second surface, the first and second surfaces comprising respective active surface portions;
providing a ridge having a groove longitudinally extending along the top of the ridge, wherein said second surface lies on the groove;
positioning at least one point of an optical fiber on a longitudinally median plane of said second surface; and
rotating the first surface relative to the second surface around a rotational axis oriented transversally with respect to said median plane, so as to bring the first and second surfaces from a first relative position into a second relative position, so as to accommodate a section of an optical fiber between the first and second surfaces, the first and second active surface portions cooperating to keep the optical fiber in a predetermined bent condition.

25. The method of claim 24, wherein said predetermined bent condition is adapted to enable extraction or injection of optical energy from or into the optical fiber.

26. The method of claim 25, further comprising optically coupling said active surface portions to an opto-electronic device, wherein said opto-electronic device is selected from a photodetector responsive to the optical energy extracted from the optical fiber and a light source for injecting light into the optical fiber.

27. The method of claim 24, wherein said providing the first surface comprises providing a pair of walls defining a channel therebetween, wherein said first surface lies on a bottom surface of the channel.

* * * * *

UNITED STATES PATENT AND TRADEMARK OFFICE
CERTIFICATE OF CORRECTION

PATENT NO. : 7,725,001 B2  Page 1 of 1
APPLICATION NO. : 12/223377
DATED : May 25, 2010
INVENTOR(S) : Del Rosso It is certified that error appears in the above-identified patent and that said Letters Patent is hereby corrected as shown below:

Claim 10, column 17, line 15, "conditions is adapted" should read --condition is adapted--.

Signed and Sealed this

Thirtieth Day of November, 2010

David J. Kappos
*Director of the United States Patent and Trademark Office*